SUSAN LAFFERTY.
Dish-Pans.
No. 139,252.    Patented May 27, 1873.
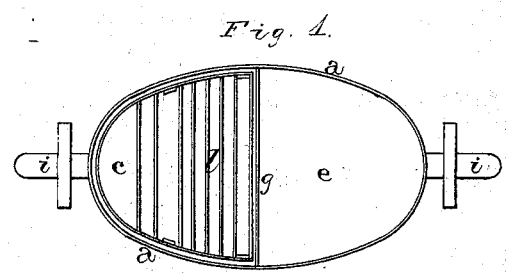
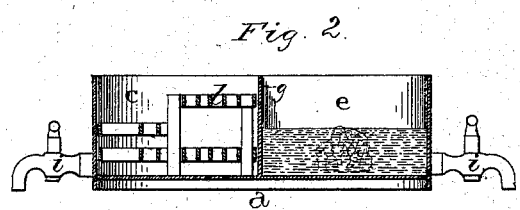
WITNESSES.
Wm. Johnson
H. G. Kendig.
INVENTOR.
Susan Lafferty
per F. A. Lehmann, Atty.

UNITED STATES PATENT OFFICE.

SUSAN LAFFERTY, OF CHICAGO, ILLINOIS.

IMPROVEMENT IN DISH-PANS.

Specification forming part of Letters Patent No. 139,252, dated May 27, 1873; application filed April 26, 1873.

*To all whom it may concern:*

Be it known that I, SUSAN LAFFERTY, of Chicago, in the county of Cook and State of Illinois, have invented certain new and useful Improvements in Dish-Pans; and I do hereby declare the following to be a full, clear, and exact description of the invention, such as will enable others skilled in the art to which it pertains to make and use it, reference being had to the accompanying drawing which forms part of this specification.

The nature of my invention relates to an improvement in dish-pans; and it consists in dividing the pan into two parts, in one of which is placed a suitable rack so that the dishes after being washed in the other part can be stood on their edges in the rack to drain and dry, as will be more fully set forth hereafter.

Figure 1 is a plan view of my invention. Fig. 2 is a section of the same.

$a$ represents a dish-pan, of any desired size or shape, which is divided into two compartments, $e\ e$, by the partition $g$, each compartment being provided with a faucet, $i$, so that the water in either can be readily drained off without moving the pan. Placed in one of the compartments is a rack, $l$, of any suitable description, in which the dishes can be stood upon their edges after having been washed in the other compartment to drain and dry.

This device will be found to be very serviceable in every family and hotel, as it makes the operation of washing dishes much more pleasant and cleanly in every way. Instead of the common faucets shown, those having a larger opening or a gate may be used instead.

Having thus described my invention, what I claim as new, and desire to secure by Letters Patent, is—

The pan $a$ divided into compartments, in combination with a suitable rack for draining the dishes, substantially as set forth.

In testimony that I claim the foregoing I have hereunto set my hand.

SUSAN LAFFERTY.

Witnesses:
M. A. LOOMIS,
JAMES COOPER.